March 15, 1960 M. E. LINDSEY 2,928,656
WIRE PULLER
Filed Feb. 1 1955
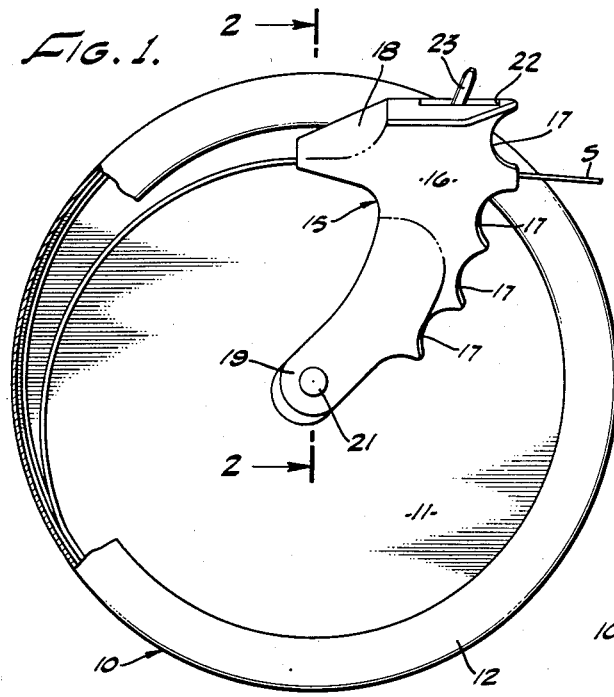
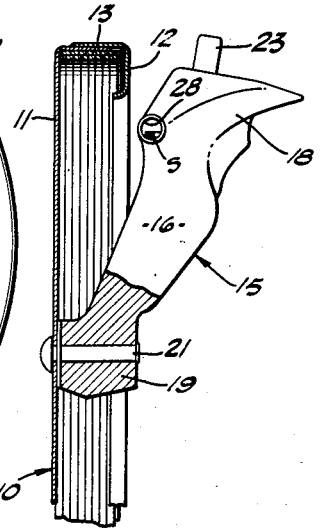
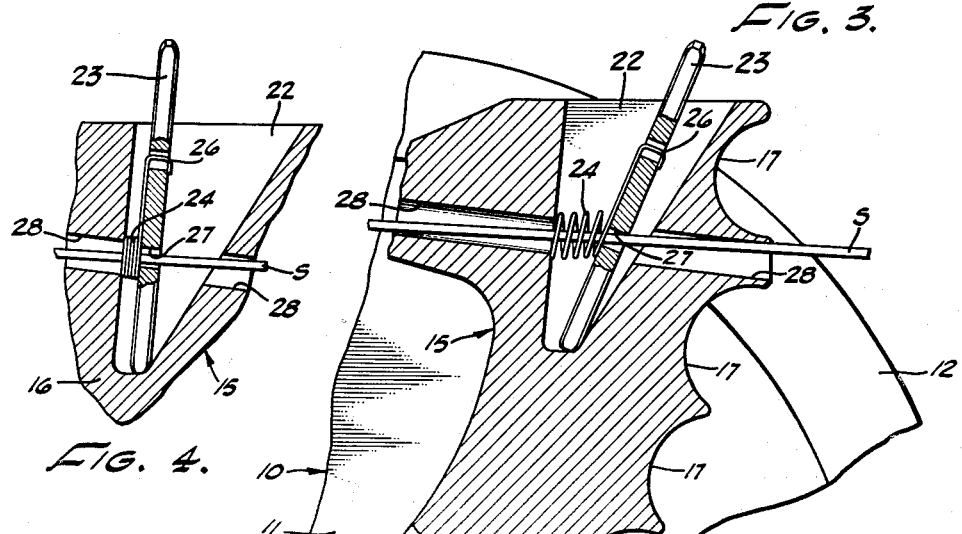
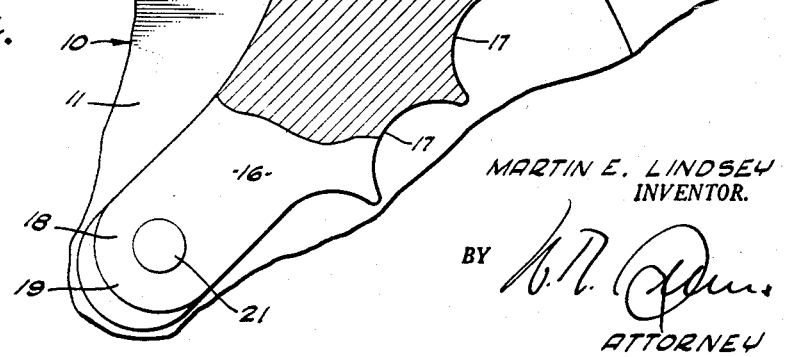
MARTIN E. LINDSEY
INVENTOR.
BY
ATTORNEY United States Patent Office 2,928,656
Patented Mar. 15, 1960

2,928,656
WIRE PULLER
Martin E. Lindsey, Santa Ana, Calif.
Application February 1, 1955, Serial No. 485,385
19 Claims. (Cl. 254—134.3)

The present invention relates to wire pullers in general and particularly to a simple hand-operated wire puller. More specifically the present invention relates to a simplified wire puller adapted to be carried in the hand, which automatically reels in and stores the wire or "snake" as it is retrieved, and which includes "feed-out" means.

In the construction of buildings, and frequently in their rehabilitation, it is necessary to pull wires and cables through elongated conduits positioned in the walls and under the floors. In an accepted technique a wire or "snake" is first fed through a conduit through which the conductor or cable is to be pulled. This wire or "snake" is then attached at its end to the conductor or cable to be positioned in the conduit and is then pulled back or retrieved. The present invention comprises a simple wire puller or wire-retrieving unit useful in storing the "snake," in forcing it into a conduit, and in pulling it from a conduit. It is adapted to be held in one hand and functions, when displaced in one direction, to pull the "snake" through the conduit and, upon having its direction of travel reversed, to take in, coil and store the length of wire or "snake" which has been pulled from the conduit. By the simple act of depressing a lever with the thumb of the hand which carries the unit, the "snake" is locked relative to the unit so that by moving the unit toward the conduit the "snake" can be fed into it. Moving the unit back from the conduit with the same lever held by the thumb in a second position permits the "snake" to feed out so that a second "bite" can be taken and an additional length of the "snake" fed into the conduit by repeating the first movement. At no time is the "snake" left loose and uncoiled upon the floor at the end of the conduit to create a hazardous condition especially where electrical contacts, switches, circuit breakers, etc., are present as is frequently the case in installations such as telephone buildings, factories, and electrical power plants.

It is an object of the present invention to provide a new and improved wire puller.

It is another object of the invention to provide a hand-held wire puller which automatically winds the stores the retrieved "snake."

A further object of the invention is to provide a hand-held wire puller which automatically clamps the wire when moved in one direction to enable a pulling force to be exerted on the wire, and which automatically releases the clamping action and retrieves, coils and stores the wire when moved in the opposite direction.

It is another object of the invention to provide a hand-held wire puller and wire storing unit adapted for use in forcing a wire into a conduit.

It is another object of the invention to provide a hand-held wire puller which includes manually operable wire clamping means which automatically lock the wire against displacement from the unit and permit the wire to be fed into the unit, but which are manually positionable to lock the wire relative to the unit or to permit the movement of the wire into or from the unit.

These and other more specific objects will appear upon reading the following specification and claims and upon considering in connection therewith the attached drawing to which they relate.

Referring now to the drawing in which a preferred embodiment of the invention is illustrated:

Figure 1 is a side elevational view of a wire puller constructed in accordance with the present invention, a portion of the side wall of the reel being broken away to show the wire or "snake" coiled and stored;

Figure 2 is a partial section upon the line 2—2 of Figure 1;

Figure 3 is a fragmental section through the handle of the unit showing the spring-actuated clamp in wire-locking position; and Figure 4 is a partial view of the fragmental section of Figure 3 showing the clamping element pivoted into position to permit of free displacement of the stored wire.

The wire puller constructed in accordance with the present invention is seen to comprise a reel, indicated generally by the reference character 10, and a handle unit upon which the reel is rotatably mounted and which is indicated generally by the reference character 15. Both parts are preferably of metal although strong, durable plastic could be used.

Reel 10 includes a solid back 11, a relatively narrow side wall 12 spaced from back 11 and which has a radial extent only a fraction of the diameter of the reel, and a peripheral rim 13 formed by overlying right angle extensions of walls 11 and 12. The circular channel or groove formed by the walls 11 and 12 and the peripheral wall 13 constitutes the housing receptacle or channel in which a coiled wire can be stored in a coiled relationship upon being fed through the open side of the reel in the manner illustrated clearly in Figure 1.

Handle unit 15 comprises a solid one-piece body 16 shaped in the form of a handle grip with four finger recesses or seats 17 along its forward wall and a thumb seat 18. Body 16 is so sized that with the fingers gripping the seats 17 the operator's thumb may extend either along the side of body 16 adjacent the reel 10 or be positioned in seat 18 and extend along the top of the body. At its lower end the body 16 includes a pin-carrying portion 19 having parallel spaced side walls one of which abuts the inner base of the reel back wall 11. A headed pin 21 extends through the portion 19 and the wall 11 and rotatably mounts the reel relative to the handle unit. The general extension of the latter is outwardly at an angle from the reel center in the manner illustrated in Figure 2.

A V-shaped relatively narrow channel, indicated by the reference character 22, is provided in body 16 of handle unit 15 with its open wide end at the top of the unit and its closed inner end positioned centrally thereof. Channel 22 is relatively narrow transversely of handle unit 15 and its front and rear sides diverge at an angle of approximately thirty degrees. A wire-locking lever 23 having an opening 27 in its lower portion is positioned in channel 22 and protrudes slightly above the top of body 16, its width being substantially that of the channel so that its permitted range of movement is a forward and rearward angular tilting movement through the approximately thirty degree angle defined by the recess 22. A coil spring 24, one end of which is hooked through the lever 23 at 26, is positioned between the lever and the rearward side of channel 22 and at all times exerts a force tending to pivot the lever forwardly. A bore or passage 28, in alignment with the lever bore 27, extends through body 16 between its front and rearward extremities and intersects channel 22, as is clearly illustrated in Figures 3 and 4. Passage 28 is angularly inclined with respect to the plane of the reel 10 so that if it were projected rearwardly it would extend just inside the inner edge of reel front wall 12. The relationship is such that a wire or "snake" can extend through the bore 28, the channel 22, and the lever opening 27 and upon emerging from the rear end of the passage 28 curves naturally and easily into the curvature of the rim 13, as is clearly illustrated in Figure 1.

The clamping or locking lever 23 of the handle unit performs a very important function. The lever is at all times urged forwardly by the coil spring 24. The diameter of the lever opening 27 is somewhat less than that of the bore 28 and as the lever pivots forwardly about its lower end in the channel 22 the forward edge of its passage 27 crosses and intercepts wire S. If a pull is being exerted on wire or "snake" S tending to pull it to the right, as viewed in Figure 3, this binding action of the lever with the wire tends to pivot the lever farther in a clockwise direction and a binding action results so that the wire is effectively clamped. The same result obtains if the handle unit is pulled to the left against a resisting force exerted from the right end of the wire or "snake" S. This is the action which takes place when the "snake" or wire is being retrieved from a conduit with an attached wire or cable exerting a resisting force at its opposite end. On the other hand, if the reel and handle unit are advanced to the right, the wire or "snake" S being held fixed, and as viewed in Figure 3, the wire is free to advance through the bore 28, the frictional resistance of the wire upon the lever upon passing through its passage 27 serving merely to pivot the lever 23 in a counterclockwise direction which slightly compresses the coil spring 24. No binding action results and the wire is free to advance to the left through the passage 28, as viewed in Figure 3, to be directed into the reel 10. If, however, it is desired to lock the "snake" relative to the handle unit so that a force may be exerted on the "snake," as in forcing it into a conduit, the lever 23 is forced forwardly by the operator's thumb which is conveniently adjacent when on its seat 18 and extended along the top of body 16.

The use of the wire puller constructed in accordance with the present invention in feeding the "snake" into and pulling it from a conduit will now be described. Let it be assumed that the unshown end of the wire or "snake" S is to be advanced through a conduit and attached at its far end by suitable means, which may be a loop or a clamp, to a conductor or cable which is to be pulled back through the conduit. The operator picks up the wire puller, placing his fingers around the handle unit 15 with his thumb extended on its seat 18 and along top of body 16. Two or three feet approximately of the "snake" are positioned between unit 15 and the mouth of the conduit. The operator with his thumb pivots lever 23 forwardly into its locking position shown in Figure 3, thereby clamping the "snake" to the unit and literally shoves the unit toward the mouth or end of the conduit. Within the distance between the unit and the conduit mouth, the wire has sufficient rigidity that it is forced into the conduit instead of bending. When the unit has traveled substantially to the conduit mouth the operator, still using the same thumb, pivots the locking lever from its locking position of Figure 3 to its inoperative position of Figure 4 and pulls the unit from the conduit mouth substantially to its first position during which displacement wire was fed out from the unit, the reel 10 rotating as required and as freely permitted by its mounting on handle unit 15. The described step of forcing the wire into the conduit is then repeated and the step-by-step operation continued until the required length of wire has been fed into the conduit.

Let it now be assumed that the conductor or cable to be finally positioned in the conduit has been attached to the coil of the "snake" which has been inserted into the conduit in the manner just described. The operator removes his thumb from lever 23 and displaces the unit from the open end of the conduit by a force exerted solely through the handle unit 15. This movement to the left, as viewed in Figures 1 and 3, of the handle unit automatically causes the clamping lever 23 to bind upon the "snake" S, as previously described, and the "snake" is pulled from the conduit. The length displaced is a variable and may be only an arm's length following which the operator must take another "bite" upon the "snake." This he does simply by displacing the unit toward the mouth of the conduit. The "snake" S has sufficient rigidity and resistance to bending and forces its way back through the passage 28 encountering no binding resistance from the freely pivoting locking lever 23, as previously described. As it is fed through the handle unit, the "snake" S is directed into the peripheral rim of the reel 10 which rotates as the wire is fed into it, the wire collecting in the reel and into the relationship clearly shown in Figures 1 and 2.

If at any time it is desired to feed the wire freely into the reel or to displace it freely therefrom, it is only necessary for the operator to hold the locking lever 23 in its vertical position shown in Figure 4 in which its bore or passage 27 is aligned with the passage 28 at which time no resistance is offered to the displacement of the "snake" in either direction.

While the particular apparatus herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A combined storage reel and wire handling device comprising a storage reel, a handle unit movably mounted on said reel and having a wire guide passage therein, a wire clutching device carried by said handle and traversing said wire guide passage and operable when said handle is moved in one direction to clutch a wire located in said passage and move it in unison with said handle, and said clutch and said handle being freely movable independently of the wire when moved in the opposite direction.

2. A combined storage reel and wire handling device as defined in claim 1 wherein said reel includes an inturned rim formed to store wire fed thereinto from one side of said rim.

3. A combined storage reel and wire handling device as defined in claim 1 wherein said reel has an inturned rim and an open face opposite one inturned edge of said rim, and wherein the wire guide in said passage opens toward the interior of said reel from a point spaced radially inward of the rim thereof.

4. A combined storage reel and wire handling device as defined in claim 1 wherein said handle includes a hand grip portion with one end pivoted to the center of said reel, said wire guide being located in the opposite end of said handle from said pivot and in an area closely adjacent the rim of said reel to feed wire into or dispense wire from the internal rim portion of said reel.

5. In a wire puller, a handle unit including a body formed with a passage to serve as a wire guide, a wire clamp carried by said body to lock a wire extending through said passage against displacement therethrough in one direction, and a wire collector reel rotatably connected to said handle unit positioned to receive said wire upon its emergence from one end of said passage.

6. The construction recited in claim 5 characterized in that said wire collector reel is rotatably connected to one end of said handle unit body and in that said body extends upwardly and out at an angle from the plane of said reel with said passage so positioned as to guide said wire into the interior of said reel.

7. The construction recited in claim 5 characterized in that said wire clamp comprises a lever pivoted in said body and extending therefrom into a position to be actuated by the thumb of the hand of the operator holding said handle unit.

8. The construction recited in claim 5 characterized in that said clamp comprises a lever pivoted in said body and formed with an opening in alignment with said passage, the walls of said opening binding upon a wire traversing said body in certain angular positions of said lever.

9. The construction recited in claim 8 characterized in that a coil spring between said body and said lever exerts a force on said lever urging it into wire-binding position.

10. The construction recited in claim 9 characterized in that the force exerted by said spring is of a magnitude enabling said lever to be displaced from its binding position under a frictional force received from a wire being fed through said body and into said reel.

11. A wire puller unit comprising a wire storage unit and a handle unit, said handle unit including a wire guide through which wire passes in its movement to or from said storage unit, said handle unit also including wire clamping means normally locking said wire against displacement in one direction and permitting displacement in the opposite direction.

12. The construction recited in claim 11 characterized in that said clamping means includes manually operable means extended into position to be operated by the operator to actuate said clamping means to prevent displacement of said wire in any direction relative to said handle unit.

13. The construction recited in claim 11 characterized in that said clamping means includes means extended into position to be operated by the operator to release said clamping means to permit free displacement of said wire in both said one and said opposite directions.

14. The construction recited in claim 12 characterized in that said manually operable means comprise a lever extended as to be engageable by the thumb of the operator's hand which is seated upon said handle unit.

15. The construction recited in claim 13 characterized in that said manually operable means comprise a lever extended as to be engageable by the thumb of the operator's hand which is seated upon said handle unit.

16. A combined wire storage reel and handling device comprising a disc having a wide inturned rim providing an annular wire storage chamber fed from the inner radial side thereof, a wire handling device including a hand grip portion pivotally secured to the center of said reel on the open face thereof, said hand grip having a wire guide passage extending across the outer free end thereof, and automatically-acting one-way clutch means operatively associated with said passage for locking the wire against movement in said passage when the portion of the wire dispensed is under tension whereby said hand grip can be used to grip the wire at any point along its length and to apply a pulling force thereon while keeping non-dispensed wire stored within said reel.

17. A combined wire storage reel and handling device comprising an annular storage reel provided with a wire inlet passage on the inner radial side thereof, means providing a guide passage for feeding wire into and dispensing wire from said wire inlet passage, said reel and last named means being relatively rotatable about a common axis, and clutch means carried by said guide passage means selectively operable to allow free movement of wire through said guide passage or to lock the wire against movement therein.

18. A combined wire storage reel and handling device as defined in claim 17 wherein said clutch means includes a spring biasing the same in one direction and a finger engageable portion on said clutch means accessible to the operator for operating said clutch to counter to said spring as well as in a manner supplementing said spring.

19. A combined wire storage and handling device comprising an annular storage reel formed by a disk having a wide inwardly-curled rim adapted to receive and dispense wire from the inner curled edge of said rim, and means for guiding wire into and from stowage within said curled rim by passage past the inner rim edge thereof, said guide means including handle means rotatably supported at the axis of said reel disk and having a wire guide passage embracing the wire and extending substantially tangentially from a point inwardly of said curled rim and to one side of said reel rim, and clutch means for the wire as it passes through said passage.

References Cited in the file of this patent

UNITED STATES PATENTS

| | | |
|---|---|---|
| 1,880,431 | Goodall | Oct. 4, 1932 |
| 1,890,945 | Hormel | Dec. 13, 1932 |
| 2,173,352 | Carson | Sept. 19, 1939 |
| 2,220,481 | Fritts | Nov. 5, 1940 |
| 2,227,442 | De Miller | Jan. 7, 1941 |
| 2,534,472 | Norvelle | Dec. 19, 1950 |
| 2,689,709 | Waldschmidt | Sept. 21, 1954 |